United States Patent [19]

Norton

[11] 3,828,269

[45] Aug. 6, 1974

[54] CURRENT FOLLOWER AMPLIFIER

[76] Inventor: Ralph S. Norton, 4 Debra Pl., Syosset, N.Y. 11791

[22] Filed: Nov. 22, 1972

[21] Appl. No.: 308,747

[52] U.S. Cl. .................... 330/97, 330/107, 330/165

[51] Int. Cl. .............................................. H03f 1/36

[58] Field of Search ......... 330/28, 79, 97, 102, 107, 330/109, 165

[56] References Cited

UNITED STATES PATENTS

| | | | |
|---|---|---|---|
| 2,216,829 | 10/1940 | Plebanski | 330/107 X |
| 2,358,480 | 9/1944 | Skilling | 330/105 X |
| 3,435,361 | 3/1969 | Van Doorn | 330/28 |

FOREIGN PATENTS OR APPLICATIONS

| | | | |
|---|---|---|---|
| 1,121,329 | 4/1956 | France | 330/28 |

*Primary Examiner*—Herman Karl Saalbach
*Assistant Examiner*—James B. Mullins
*Attorney, Agent, or Firm*—Howard C. Miskin

[57] ABSTRACT

A linear broad band current follower amplifier in which the input and output impedances are isolated includes a magnetic core on which are wound inductively coupled input, sense and feedback windings. An input signal is applied to the input winding, the sense winding is connected to a quadrature amplifier circuit input, and the feedback winding is connected to the amplifier circuit output in a sense that the MMF produced by the feedback winding opposes the MMF produced by the input winding. The feedback winding is connected in series with a resistor across the amplifier input so that in addition to the MMF inverse feedback there is dc inverse feedback in the amplifier circuit.

12 Claims, 11 Drawing Figures

CURRENT FOLLOWER AMPLIFIER

BACKGROUND OF THE INVENTION

The present invention relates generally to improvements in amplifiers and it relates particularly to an improved linear broad band amplifier with an induction coupled input in which the input and output load impedances are isolated.

Conventionally, devices designed to be linearly responsive to a magnetic field depend on the existence of a magnetic flux and generally include a low reluctance path to maximize the flux for increased sensitivity. Linear magnetic materials are chosen to preserve linearity between input and output magnitudes. For time varying fields it has been additionally important to choose methods and materials to reduce core loss which increases with flux magnitude and frequency.

Those devices which employ a coil or winding to encompass the magnetic flux have induced therein an emf proportional to the number of turns on the coil and the time rate of change of the flux, and are inductive in nature. The emf obtained is the time derivative of the flux and must be further conditioned to obtain a signal proportional to the flux. Associated with a coil so employed is its self inductance, resistance and capacitance which determines and limits the sensitivity and frequency response.

Inductive devices, while nonresponsive to magnetostatic fields, can be made responsive to quite slowly changing fields by increasing the coil turns thus increasing the induced emf. However, this can lead to excessive induced emfs in rapidly changing fields as well as a high inductive reactance, and a low resonant frequency which causes the coil terminal voltage to differ from the induced emf. Therefore, most such devices in practice exhibit a low frequency limitation determined by the sensitivity and a high frequency limitation determined by the losses, the self reactances and the loading.

SUMMARY OF THE INVENTION

It is a principal object of the present invention to provide an improved amplifier.

Another object of the present invention is to provide an improved induction coupled amplifier.

Still another object of the present invention is to provide an improved amplifier having an induction coupling in which the input signal is applied as a magnetomotive force (MMF), the amplifier being characterized by its high linearity over a broad band from very low to high frequencies, minimum distortion and isolated input and output.

A further object of the present invention is to provide an amplifier of the above nature of low cost and great reliability, and compactness and in which low turn windings on magnetic cores of small size may be employed to advantage and in which any lossiness or nonlinearity of the magnetic core has little effect on the overall operating parameters and characteristics of the amplifier or on its efficiency, linearity or operation.

The above and other objects of the present invention will become apparent from a reading of the following description taken in conjunction with the accompanying drawings which illustrate preferred embodiments thereof.

In a sense the present invention contemplates the provision of a network comprising a sense winding, a feedback winding inductively coupled with the sense winding, input signal means for producing a varying MMF and flux through the sense winding, an amplifier circuit having an input coupled to the sense winding and means coupling at least a fraction of the output of the amplifier circuit to the feedback winding in a sense to produce with the feedback winding an MMF and flux opposing the emf induced in the sense winding by the input signal means.

According to one embodiment of the improved amplifier, an input winding, and at least partially coextensive sense and feedback windings are wound on a magnetic core which can be open but is advantageously closed, such as a toroid. The feedback winding is connected in series with a resistor across the input of the amplifier circuit which is advantageously an integrated circuit solid state operational amplifier, so that the inverse feedback is not only an MMF feedback through the feedback and sense windings but an inverse dc feedback.

The improved amplifier is substantially independent of the linearity and loss characteristics of the magnetic core, provides a high linearity response over a broad band range from very low to high frequencies and is reliable, inexpensive, compact and of great versatility and adaptability.

DESCRIPTION OF THE INVENTION

Figure 1:
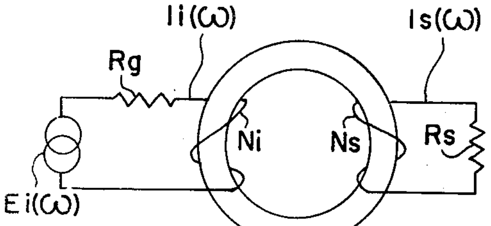
FIG. 1 is a schematic view of a resistor loaded transformer coupled to a signal source.

For a magnetic flux $\phi$ to exist it must arise from a magnetizing force (H), variously referred to as magnetic intensity, magnetic field strength or magnetic potential gradient, and is further a vector point function, the line integral of which around a closed path is defined as the total magneto motive force (MMF) around that path, and it follows that the MMF between any two points in a magnetic circuit is equivalent to the line integral of H over any path between those points. The magnitude of the magnetic flux between any two points then is proportional to the MMF difference of those points and the permeance P of the path in accordance with the law of the magnetic circuit.

Considering MMF sources as amperes (or ampere-turns) inclosed by a closed path, the MMF potential differences along the path are proportional to the flux magnitude and path reluctance in each segment thereof and the total MMF potential drop of all the segments of a closed path equals the total MMF applied. If the path is toroid, and a segment of zero permeance is introduced, the flux within the toroid would approach zero as would the MMF potential drops in the remainder of the toroid, and the MMF potential across the zero permeance segment would substantially equal the total MMF applied. Then by measuring the MMF potential across the zero permeance segment, the MMF of the source could be determined despite substantial reluctance between the two. A permeance of zero (an inability to support magnetic induction) ordinarily does not exist in materials or space, but for time varying fields applied to super conductors at ultralow temperatures, and at high frequencies to conductors at normal temperatures, a surface eddy current is induced in a direction determined by Lenz's law, which then acts as a barrier to flux penetration to within the conductor.

Conventional methods for the detection, measurement, and utilization of magnetic fields are analogous to creating a magnetic hole through which the flux will preferentially course and be concentrated for use. This approach decreases the total reluctance of the system, thereby loading the source. In most systems the source will behave as a flux source rather than an MMF source due to the high reluctance looking back.

Alternatively using a zero permeance approach is analagous to creating a magnetic barrier through which magnetic flux cannot traverse. This will increase the total reluctance of the system, thereby lessening the source loading. The MMF difference measured across the barrier then is more closely a measure of the source strength. This method is closely analagous to an electric circuit in which the voltage is measured rather than the current and the measuring device does not load the circuit.

Non linearities in magnetic materials are a function of flux density and contribute the distortion normally associated with magnetic devices. Reducing the flux then similarly reduces distortion.

Analysis on the basis of the relationships in a magnetic circuit will further disclose the principles herein.

In a magnetic circuit, the relationship between magnetic flux $\phi$ and magnetomotive force, MMF or $F$, is expressed by $$F = R\phi \quad (1).$$

where $R$ = reluctance.

If the MMF is contributed by a coil of n turns carrying a current of I amperes, then $$F = nI \quad (2).$$

Expressed as a function of the angular frequency $\omega$ in radians per second, which is equal to $2\pi$ times the frequency in Hertz, the induced voltage $e(\omega)$ in a winding encompassing a magnetic flux is proportional to the time rate of change of the flux and the number of turns N on the winding (Faraday's Law):

$$e(\omega) = j\omega N\phi(\omega) \quad (3).$$

or in terms of the flux density B in a core of cross sectional area $A$:

$$e(\omega) = j\omega NAB(\omega) \quad (4).$$

From equation (1) in terms of MMF the induced voltage is $$e(\omega) = j\omega N\, F(\omega)/R \quad (5).$$

and from equation (2) in terms of current:

$$e(\omega) = j\omega NnI(\omega)/R \quad (6).$$

or alternatively equation (6) can be expressed in terms of the mutual inductance M between the winding n and N so that:

$$e(\omega) = j\omega MI(\omega) \quad (7).$$

Considering the circuit of FIG. 1, which is similar to a transformer with a loaded secondary, if a primary current $Ii\ (\omega)$ flows in winding $Ni$, due to the voltage $Ei\ (\omega)$ connected thereto via the series impedance $Rg$, where $Rg$is much greater than the winding impedance and therefore determines the primary current, then the secondary winding Ns has induced in it an emf per eq. (7) and a secondary current $Is\ (\omega)$ will flow of magnitude:

$$Is(\omega)/Ii(\omega) = (j\omega M)/(Rs + j\omega Ls) \quad (8).$$

where $M$ = mutual inductance of windings $Ls$ = secondary inductance $Rs$ = secondary resistance and $M = Ni/Ns\ Ls$ Considering the coefficient of coupling unity, eq. (8) reduces to $$Is(\omega)/Ii(\omega) = Ni/Ns\ (1/1 - j(\omega e/\omega)) \quad (8A).$$

where $$\omega e = Rs/Ls$$

Below frequency $\omega e$, the secondary current goes to zero at dc, and above $\omega e$ eq. (8A) approximates:

$$Is(\omega)/Ii(\omega) = Ni/Ns \quad (8B).$$

which may be rewritten as $$NsIs(\omega) = NiIi(\omega) \quad (8C).$$

Considering each side of eq. (8C) as ampereturns or MMF and further that one is an input MMF and the other is an output MMF it follows that the two approach equality and the net MMF and flux experienced by the core decreases since the primary current remains substantially constant.

Considering the power dissipation, the loss in the secondary and the current therein is no longer a function of frequency at $\omega e$ and above and the power $Pi$ lost therein is $$Pi = [NiIi(\omega)]^2\ Rs/Ns^2 \quad (9).$$

which is proportional to $\omega e$ and the square of the input level and is supplied by the input.

Figure 2:
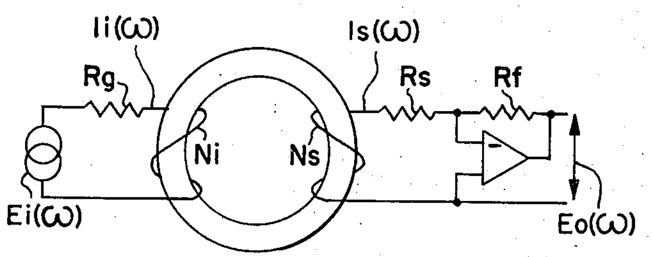
FIG. 2 is a schematic view of a transformer coupled amplifier network.

The circuit of FIG. 2 is a modification of FIG. 1 wherein the classical resistance-inductance (RL) integrator is substituted for the short circuit on the secondary winding. The amplifier output feedback is via resistor $Rf$ to the inverting input. With high gain, the inverting input appears as a virtual ground and the same current equations (8A through 8C) hold, the secondary current here being injected into the amplifier thereby permitting amplification.

The amplifier output voltage $Eo(\omega)$ is then $$Eo(\omega) = Rf\ Is(\omega) \quad (10).$$

and from eq (8C) above $\omega e$ eq. (10) becomes $$Eo(\omega) = Rf\ Ni/Ns\ Ii(\omega) \quad (10A).$$

from which the sensitivity is $$S = Eo(\omega)/NiIi(\omega) = Rf/Ns \quad (11).$$

and substantial output levels can be achieved.

Both the methods of FIG. 1 and FIG. 2 exhibit a low frequency response limitation determined by the ratio $Rs/Ls$, and it is desirable that the resistance be low and the inductance high for response to low frequencies and that the turns be low for improved sensitivity and freedom from resonance at high frequencies.

The severe requirements on the secondary resistance and inductance thus contribute to an increased manufacturing cost and size and weight due to the critical selection of materials, dimensions and tolerances involved particularly in extending the low frequency response.

Figures 3, 4:
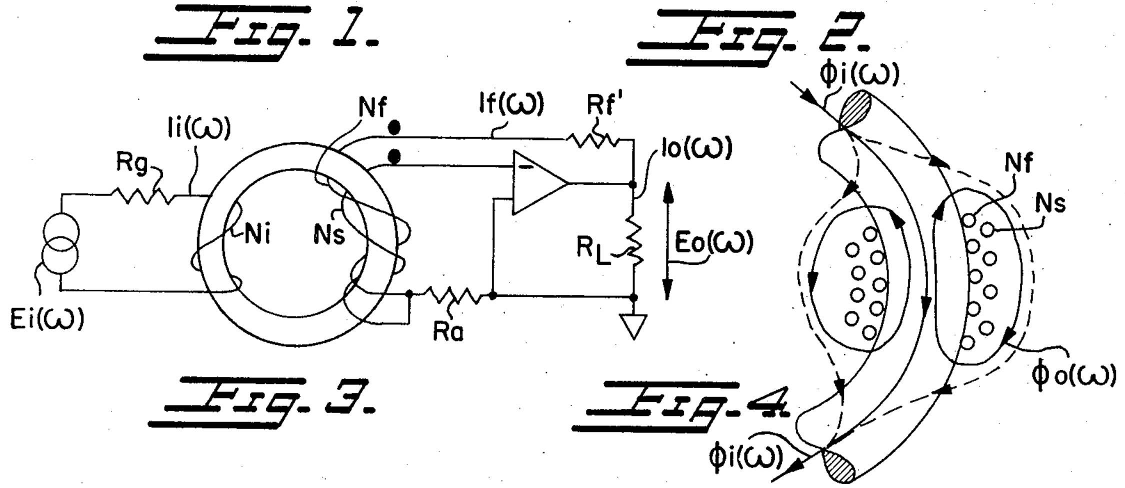
FIG. 3 is a schematic view of a basic network embodying the present invention.
FIG. 4 is a fragmentary diagrammatic view of a section of the magnetic core of the network in FIG. 3.

The low frequency response may be extended down in frequency several orders of magnitude and the sensitivity increased by the feedback system shown in FIG. 3 wherein a separate feedback winding energized from the amplifier output is employed. The feedback path consists of the resistor $R'f$ in series with inductor $Lf$ of $Nf$ turns and resistor $Ra$. From the junction of $Lf$ and $Ra$ the original secondary winding $Ns$ is connected in series to the amplifier inverting input. Winding $Nf$ is on the same core as winding $Ns$ and is of the same polarity, i.e., similar polarities are junctioned at the common point. In this manner winding $Ns$ becomes a sense winding and since substantially no current flows in it due to the high input impedance of the amplifier inverting input, its resistance now has little effect. Winding $Ns$ is responsive to any time varying flux in the core whether contributed by an external source or the feedback winding $Nf$.

The low frequency gain of the amplifier down to dc is determined by the resistance ratio, $R'f/Ra$. The resistance of the feedback winding itself may be lumped with $R'f$ in determining this ratio. With increasing frequency the gain is determined by the MMF feedback. Using a high gain fully compensated amplifier the output voltage and the current in the feedback winding will be in quadrature with its inverting input signal which is the net induced voltage in the sense winding due to the input and feedback winding MMF's. Polarized as shown, the feedback MMF opposes the input MMF and the induced voltage approaches zero so that:

$$If(\omega)/Ii(\omega) = j\omega M/(Ra + j\omega Mf) \quad (12).$$

where $M$ = mutual inductance of winding $Ni$ and $Ns$ $Mf$ = mutual inductance of winding $Nf$ and $Ns$ $If(\omega)$ = feedback current in winding $Nf$ Then $$M/Mf = Ni/Nf$$

and eq (12) in a manner similar to eq (8A) reduces to $$If(\omega)/Ii(\omega) = Ni/Nf\,(1/1 - j(\omega'e/\omega)) \quad (12A).$$

where $$\omega'e = Ra/Mf$$

Therefore the low frequency corner frequency $\omega'e$ is now independent of the winding resistances.

At frequencies above $\omega'e$ the reactive term in eq. (12A) becomes negligible and it reduces to $$Nf\,If(\omega) = Ni\,Ii(\omega) \quad (12B).$$

illustrating that the MMF feedback is now supplied by the amplifier and does not require energy from the input.

From the above it can be seen that the core flux will be suppressed by the feedback, and the extent of suppression is proportional to the loop gain as hereinafter discussed. The further effect of the suppression is to reduce the winding self reactances by the same order of magnitude because the input and the feedback windings become incapable of creating a normal flux in the core, thus reducing these reactances in proportion to the feedback. Provided the feedback resistor is then greater than the effective feedback winding reactance, the feedback current will remain substantially in phase with the output voltage $Eo(\omega)$ which now becomes $$Eo(\omega) = R'f\,If(\omega) = Ni/Nf\,R'f\,Ii(\omega) \quad (13).$$

Then the output current $Io(\omega)$ to the load RL is:

$$Io(\omega)/Ii(\omega) = Ni/Nf\,R'f/RL \quad (13A).$$

For eq (12) the assumption of a virtual ground at the amplifier inverting input was made, thus implying an extremely high gain approaching infinity.

Considering the input to the device as an MMF $Fi(\omega)$ and the feedback also as an MMF $Fo(\omega)$, it follows that the difference between the two is also an MMF $Fe(\omega)$ so that $$Fe(\omega) = Fi(\omega) - Fo(\omega) \quad (14).$$

Then $$Fo(\omega)/Fi(\omega) = [Fo(\omega)/Fe(\omega)]/[(+ Fo(\omega)/Fe(\omega)] \quad (15).$$

Where the term $Fo(\omega)/Fe(\omega)$ is the loop gain and may be expanded to:

$$Fo(\omega)/Fe(\omega) = Nf\,If(\omega)/Fe(\omega) = Nf/R'(Eo(\omega)/Fe(\omega)$$

which from eq (5) becomes (16).

$$Fo(\omega)/Fe(\omega) = Nf/R'f\,Eo(\omega)/Ee(\omega)\,j\omega Ns/R \quad (16A).$$

Where $Ee(\omega)$ is the induced voltage in the sense winding $Ns$ due to core flux caused by the error MMF $Fe(\omega)$ applied to the core of reluctance $R$. The voltage $Ee(\omega)$ is applied to the input of the fully compensated operational amplifier which has a gain characteristic expressed by $$Eo(\omega)/Ee(\omega) = G/1 + j\omega/\omega c \quad (17).$$

where $G = R'f/Ra$, the dc gain of the amplifier with dc inverse feedback applied and $\omega c$ is then its low frequency corner frequency, the gain $G$ being less than the open loop dc gain of the amplifier employed. This difference stabilizes the dc operating point of the amplifier. The MMF feedback is then an ac feedback in addition thereto.

Additionally since $Mf = Nf\,Ns/R$, eq (16A) reduces to:

$$Fo(\omega)/Fe(\omega) = Mf/Rf'f\,(jG\omega/1 + j\omega/\omega c) \quad (16B).$$

At low frequencies ($\omega<\omega c$)

$$Fo(\omega)/Fe(\omega) = Mf/R'f\,Gj\omega \quad (16C).$$

At higher frequencies eq (16B) approximates the constant:

$$Fo(\omega)/Fe(\omega) = Mf/R'f\,G\omega c \quad (16D).$$

Therefore, the loop gain is greater than unity at frequencies above $$\omega'e = R'f/GMf \text{ or } Ra/Mf \quad (18).$$

Considering that without feedback the forward gain is $$Eo(\omega)/Fi(\omega) = GNsj\omega/R(1 + j(\omega/\omega c) \cong GNs\ \ \omega c/R \quad (19).$$

And that with feedback, the gain is $$Eo(\omega)/Fi(\omega) = R'f/Nf\ \ Fo(\omega)/Fi(\omega) = S(Fo(\omega)/Fe(\omega)/1 + Fo(\omega)/Fe(\omega)) \quad (20).$$

And the sensitivity $S$ and loop gain $Fo(\omega)/Fe(\omega)$ are related by $$S\ Fo(\omega)/Fe(\omega) = R'f/Nf\ Ns/Nf\ Lf/R'f\ G\omega c = Ns\ Lf/N^2f\ G\omega c = GNs\omega c/R \quad (21).$$

which product is a constant equal to the forward gain without MMF feedback. Therefore, the gain reduction due to feedback is eq. (19) divided by eq. (20) or one plus the loop gain. The closed-loop gain expressed by eq. (20) approaches $S$ with loop gains greater than unity. Both the forward gain without MMF feedback, eq. (19), and the gain with the MMF feedback added, eq. (20), is in volts/ampere turn (V/AT). The sensitivity is a function of the forward gain and feedback and is improved with increased forward gain and the higher it is the greater is the sensitivity and flux suppression which can be achieved.

The sensitivity is held constant above $\omega'e$ by the ratio of the feedback resistor $R'f$ to the feedback turns $Nf$, therefore between frequencies $\omega'e$ and $\omega c$ the loop gain increases from unity to the value expressed by eq.

(16D), and the flux suppression similarly increases. Above $\omega c$ the loop gain and suppression no longer increase due to the compensated amplifier characteristic (eq. 17).

Cores can exhibit losses which can be attributed in the main to eddy currents which also give rise to counter MMF's within the core and have the effect of reducing the core flux. As a result the apparent reluctance of the core will increase with frequency and the mutual inductance will decrease. The magnitude of the apparent change is a function of core material and construction but is usually negligible at very low frequecies. With increasing frequency the effect is to introduce an additional pole to eq. (16B) and eq. (19) for the forward gain and the loop gain. As a result the loop gain is no longer constant above $\omega c$ but eventually decreases to unity gain, thereby introducing an upper cutoff frequency to the response.

A low loop gain gives rise to a high sensitivity and lowered upper cutoff frequency. Conversely, a high loop gain offers lowered sensitivity but extended high frequency response since the loop gain may then fall further because of the core losses before reaching unity. Increased loop gain improves both the high frequency and low frequency response by extending the follower response in both directions simultaneously. The high end improvement is, however, practically limited by the actual gain characteristic of the amplifier employed in that if it has additional high frequency poles, (eq. D17) becomes invalid in their vicinity and oscillation results if the loop gain there exceeds unity and the phase shift approaches 180° or more. The lossiness of the core therefore can improve stability by reducing the actual high frequency loop gain to unity before excessive phase shifts appear.

Equation (16D) expresses the maximum loop gain vs frequency of the follower as $G\omega c/(R'f/Mf$ where $G\omega c$ is the gain bandwidth product of the amplifier employed and is equivalent to its unity gain frequency. The ratio $R'f/Mf$ has the dimensions of frequency and since the loop gain must be greater than unity for effective following $R'f/Mf$ must always be less than the unity gain frequency of the amplifier employed.

The analysis set forth has implied a high coefficient of coupling at least between the sense winding and the feedback winding and this has been found to be desirable especially for stability at high loop gains. If not so, the feedback winding may exhibit a reactance sufficiently high which in cooperation with the feedback resistor may introduce an additional phase shift to the loop gain and the potential of self oscillation.

Equation (21) demonstrating that the product of sensitivity and loop gain is a constant equal to the forward gain without MMF feedback further shows that this constant is the product of sense winding turns, core size (eg. inductance of a 1 turn winding), and the gain bandwidth product of the amplifier employed. This product can thus be increased by additional sense winding turns, or a larger core, or by an improved amplifier. Therefore, a particular set of these elements determines the sensitivity and loop gain product potential. For example, if the forward gain is 10,000 V/AT, applying 40 db of MMF feedback results in a closed loop sensitivity of 100 V/AT.

The MMF feedback is via the feedback resistor and feedback winding which determine the sensitivity by their ratio, their respective values merely determining the impedance level of the path and the current required from the amplifier. Too low an impedance is wasteful of current and power and too high an impedance may cause the feedback winding reactance, reduced by the MMF feedback, to exceed the feedback resistance permaturely and thus lead to instability.

For example, 10 turns and 1 K offer the same feedback and sensitivity as 100 turns and 10K but the latter shifts phase a decade lower in frequency.

The low frequency response is determined by both the MMF feedback and dc feedback applied and is improved with an increase in MMF feedback and degraded with increased dc feedback being:

$$\omega'e = G\omega c/G' \text{ dc feedback/MMF feedback} \quad (22).$$

where $G'$ is the dc gain of the amplifier with no feedback applied. Selecting the feedback ratios then sets the low frequency response for the follower.

Examining further the effective inductance of a winding with and without MMF feedback applied, by definition the inductance $L$ is proportional to the flux $\phi i(\omega)$ resulting from the introduction of a current $Ii(\omega)$ to an N turn winding:

$$L = N\ \phi i(\omega)/Ii(\omega) \quad (23).$$

Which from eq (1) may be rewritten in terms of the MMF as:

$$L = N/R\ Fi(\omega)/Ii(\omega) \quad (24).$$

With the feedback winding connected an opposing MMF $Fo(\omega)$ is applied and the net MMf $Fe(\omega)$ is:

$$Fe(\omega) = Fc(\omega) - Fo(\omega)$$

An eq (24) becomes in this case $$L' = N/R\ Fe(\omega)/Ii(\omega) \quad (25).$$

Where $L'$ is the winding inductance with MMF feedback. Dividing eq (25) by eq (24) illustrates the reduction in inductance resulting:

$$L'/L = Fe(\Phi)/Fi(\omega) = 1/1 + (Fo(\omega)/Fe(\omega) \quad (26).$$

Where $Fo(\omega)/Fe(\omega)$ is the follower loop gain and $1 + Fo(\omega)/Fe(\omega)$ is the MMF feedback. Therefore, the inductance is reduced to the extent of the feedback applied.

This result is of particular interest to a consideration of the input winding impedance and shows that it is reduced and can be made very low and thereby offer negligible opposition to the input current.

The basic concept demonstrated herein is analogous to an electronic servo wherein the output flux locks onto the input flux. The output flux supplied by the amplifier exists in the same core or meduim as the input flux supplied by the input winding. However, as only one flux can exist, the net flux is greatly suppressed. As a result A) the input winding appears as a very low impedance; B) since the core is completely within the feedbackloop and is not required to transfer energy via its flux path, its imperfections are greatly minimized; C) the suppression of flux leads to the true input/output relationship which is that of an MMF balance and the input ampere turns equal the output ampere turns; D) the separate windings eliminate the winding resistances from consideration thereby simulating a perfect inductor and permit operation to very low frequencies; and E) the reduction in the input reactance and the flux suppression combine to automatically make the response independent of frequency and the current in the feedback winding becomes a scaled reproduction of the input current, and this is accomplished in one feedback loop without band division, summing amplifiers and the like.

The follower operates by sensing and suppressing an externally sourced flux within the interior of the solonoidally disposed and closely coupled sense and feedback windings. If the windings are on a toroidal like core and not uniformly distributed over its full length but concentrated in one portion thereof, the resulting suppressive action and flux distribution is shown in FIG. 4.

FIG. 4 illustrates a portion of a magnetic core carrying an input flux $\phi i$ and the sense winding *Ns* and feedback winding Nf disposed thereon. The remainder of the circuit is similar to FIG. 3 and omitted from this figure. The feedback winding *Nf* closest to the core supplies the opposing flux $\phi o$ and therefore the net flux within the windings decreases. Then, $\phi i$ appears to leave the core, travel outside the core and windings and then reenter the core as shown by the dashed path.

With a magnetic core then $\phi i$ is forced to leave the core and travel through the low permeability and longer path outside the windings thus raising the apparent reluctance of the systeim and also reducing the flux $\phi i$ in the remainder of the core, i.e., a high reluctance segment is introduced.

Figure 5:
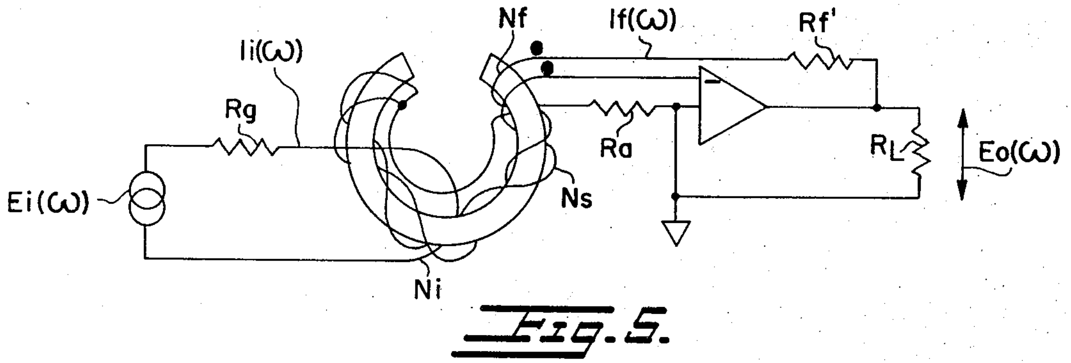
FIG. 5 is a view similar to FIG. 3 of another embodiment of the present invention.
Figure 6:
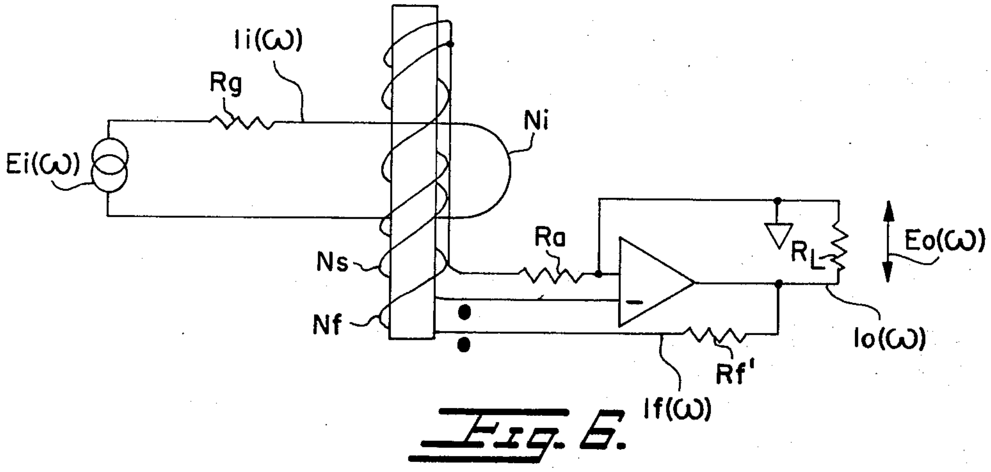
FIG. 6 is a view similar to FIG. 3 of still another embodiment of the present invention.

In this manner the operation of the follower is not limited to completely closed toroidal cores but may be gapped as shown in FIG. 5, or be a rod like core as shown in FIG. 6. All may also employ non-magnetic or air cores. In each case the input winding *Ni* should be closely coupled to the sense and feedback windings so that the flux in the input winding is similarly suppressed. The dimensions, geometry and material of the core directly effect the mutual inductance *Mf*, the larger and higher permeability cores requiring less turns than smaller or less permeable cores, and with non-magnetic cores requiring more turns than magnetic cores.

The open core structures illustrated in FIGS. 5 and 6 have the additional advantage of permitting easy access to an external current carrying conductor and therefor make convenient current or field probes without the necessity of moving parts or a conductor threading the core.

Figure 7:
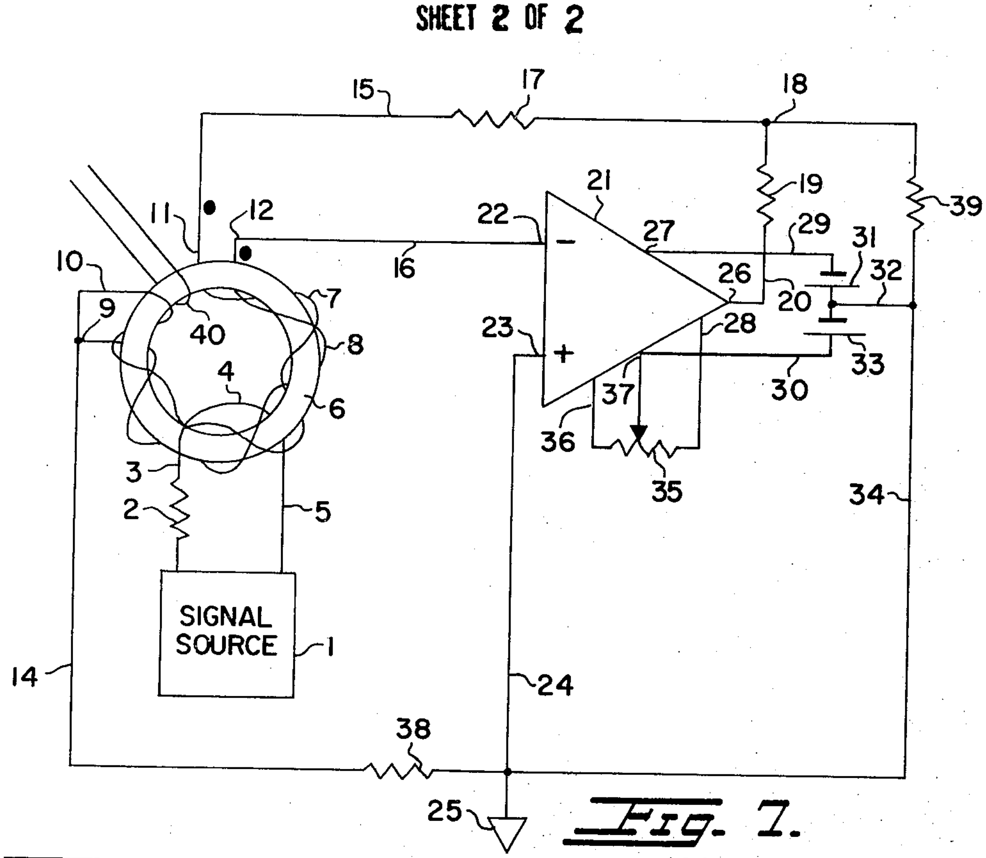
FIG. 7 is a schematic view of a specific example of an embodiment of the present invention of the nature of that shown in FIG. 3.

FIG. 7 represents a schematic diagram of a specific circuit constructed in accordance with the present invention, and is similar to the circuit of FIG. 3 utilizing a toroidal core.

The signal current to be followed is derived from a suitable signal source 1 and is connected via series current limiting resistor 2 and leads 3 and 5 to an input winding 4 on a toroidal magnetic core 6, of approximate length 3 cm and cross-sectional area 0.02 sq. cm. The resulting MMF and core flux if time varying induces an emf in the sense winding 8. The induced emf appearing at terminal 12 is applied to the inverting input 22 of a frequency compensated high gain operational amplifier 21 of the type with a single dominant pole. The other terminal 10 of the sense winding is returned to ground 25 via lead 14 and the resistor 38 which in cooperation with the series resistors 17 and 19 from the output terminal 26 of the amplifier 21 and the resistance of the feedback winding 7 determines the dc feedback and therefore sets the dc gain. The non-inverting input terminal 23 of the amplifier is held at ground potential via lead 24.

The induced emf in sense winding 8, applied to the inverting input of the amplifier in series with the dc feedback voltage, appears inverted and amplified at the amplifier 21 output terminal 26. The output voltage there appearing causes a current to arise in the series path of resistors 17 and 19 into terminal 11 of the feedback winding 7, which terminal is of the same winding polarity as terminal 12 of the sense winding 8, and thence to ground 25 via terminal 9, lead 14 and resistor 38. The sense and feedback windings are concentrically layer wound and uniformly distributed on the core.

The feedback winding 7 carrying the inverted feedback current produces an opposing MMF to that presented to the core 6 by the input winding 4, and the core flux accordingly readjusts as does the induced emf in the sense winding, which is now the algebraic sum of two induced emfs from oppositely directed fluxes, which then causes the feedback current to readjust. Equilibrium is reached when the induced emf in the sense winding causes a sufficient amplifier output and feedback current in the feedback winding to sustain the opposing MMF. The output voltage is applied to a load 39 which is connected between junction 18 of resistors 17 and 19 and the common or ground 25. Resistor 19 is a small series resistor from the amplifier output terminal 26 and is included to stabilize the amplifier 21 in the presence of capacitive loading. An output current then flows in the load 39 which is in parallel with the feedback path.

The operational amplifier employed uses a bipolar power supply consisting of batteries 31 and 33 junctioned at 32 and from there returned to ground 25 via lead 34. The positive and negative supplies are connected to the appropriate terminals of the amplifier via leads 29 and 30. Potentiometer 35 is connected to the amplifier as shown and is provided to zero adjust the dc level appearing at the amplifier output terminal 26 in accordance with the manufacturer's instructions.

The additional winding 40 is included only for testing the follower amplifier for flux suppression, the induced voltage therein with the amplifier connected and disconnected from the sense and feedback winding being a measure of the reduction. Typical values for the components of the circuit of FIG. 7 are as follows:

| | |
|---|---|
| Resistors | |
| 2,19 | 50 ohms |
| 17 | 1K |
| 35 | 10K |
| 38 | see text |
| 39 | see text |
| Amplifier and power supply | |
| 21 | Operational amplifier, Fairchild UA 74O |
| 31,33 | 9V Battery, Everready 216 |
| Core and Windings | |
| 6 | Tape wound core, Magnetics 50402-2F |
| 4 | 1 turn 32 gage wire, 5 UH inductance* |
| 7 | see text |
| 8 | 140 turns 32 gage wire, 110 mh inductance* |
| 40 | 10 turns =gage wire, 0.5 mh inductance* |

*Inductance values with amplifier disconnected, measured at 1 kHz.

Figure 8:
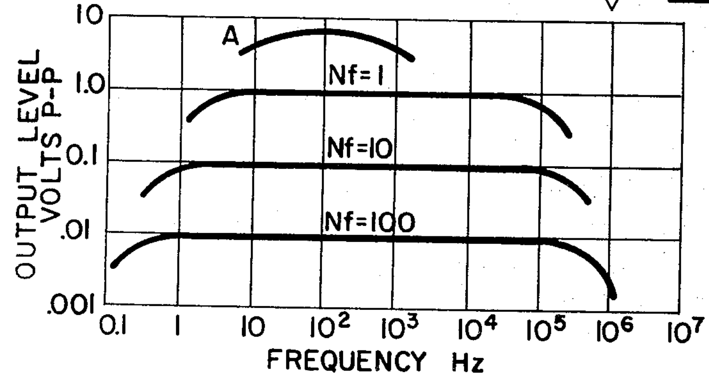
FIGS. 8 to 11 are graphs illustrating the operating parameters of the network shown in FIG. 7.

The circuit was built and tested and the findings show substantial agreement with the theory. Initial tests were made with the follower load, resistor 39 omitted, and with a resistor 38 of ¼ ohms, and at an input level of 1 milliampere turn peak to peak (1 mat). The output level vs. frequency obtained for several different values of feedback winding turns 7 is shown plotted in FIG. 8 on a log-log scale. The sensitivity was found to decrease linearly from 1,000 V/AT at 1 turn to 10 V/AT at 100 turns for winding 7. Curve A is the open loop forward gain, i.e., zero feedback turns. Increasing bandwidth is accompanied by a decrease in sensitivity, and vice versa.

Figure 9:
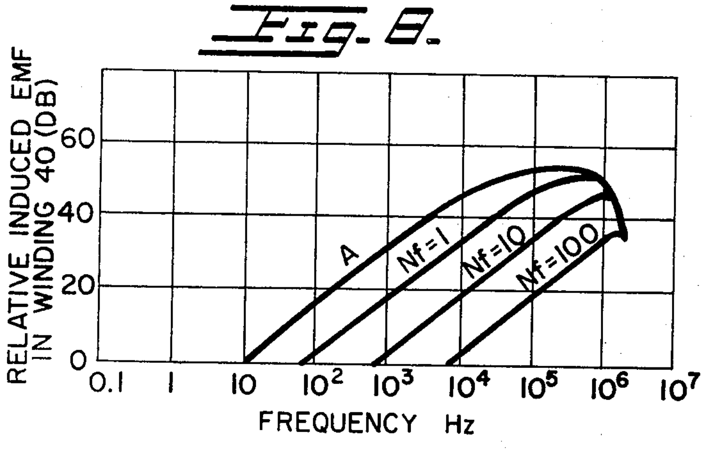

Under the same conditions, the flux suppression in the core was examined by measuring the induced emf in the test winding 40 as a function of both frequency and feedback winding turns 7, and the results plotted on a log-log scale in FIG. 9, with the amplifier disconnected, Curve A, and with the amplifier connected using the several values for the feedback winding turns.

It can be seen from Curve A that the core exhibits considerable frequency losses above 1 kHz by its departure from a 6 db/Octave slope. With the follower amplifier connected the induced voltage drops and becomes a straight line at a 6 db/Octave slope, exhibiting both a reduction in flux level and lossiness. Considering the flux suppression as the difference between any two without frequency losses considered, increasing the value of feedback turns increased the flux suppression. It is further evident from the response that with increasing frequency the apparent suppression becomes less effective, the earlier for low initial values of suppression. This effect arises because the follower requires a finite flux level to sustain a particular output level and when a lossy core becomes incapable of supplying it, the response and suppression falls off. All responses then eventually terminate in Curve A.

Therefore high sensitivity is associated with minimal flux suppression and reduced high frequency response, and a low sensitivity with high flux suppression and extended high frequency response. It is further evident that the high frequency response is not independent of lossiness of the core.

In addition to the above, tests were performed to determine linearity and the distortion limits of the follower amplifier as a function of input level, frequency and loading.

Figure 10:
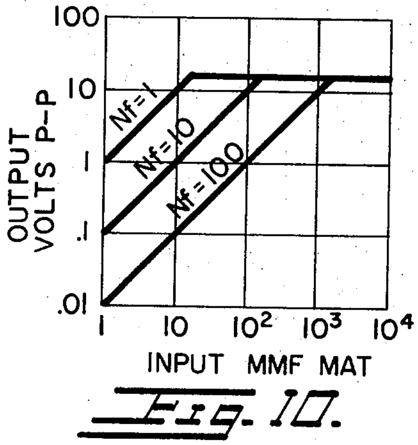

Departure from linearity was found to be very small being under 2 percent. The maximum output level achievable before saturation clipping was evident as a function of feedback turns and input MMF is shown plotted on a log-log scale in FIG. 10 at frequencies below 50 kHz. At high levels and high frequencies some slew rate limiting can appear. At amplifier output levels below 1 volt peak to peak none was evident below 1 mHz.

Figure 11:
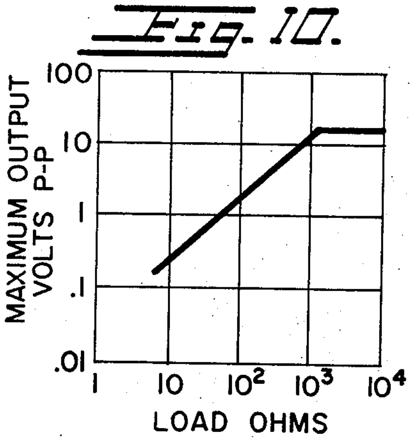

Saturation and slew rate limiting are functions of the operational amplifier employed. The saturation limit in this case is voltage limited at no load and can be increased by raising the power supply voltage. A load resistor when added will draw current from the amplifier and as shown in FIG. 11 which is a log-log plot of maximum undistorted output volts vs. load resistance, when the current limit of the amplifier is approached current saturation distortion appears and the level must be reduced for linear operation at the lower load resistances. To increase the available current to drive the load a higher current output operational amplifier may be substituted, or a power amplifier stage may be cascaded with the existing one.

Further tests were performed in the time domain using input current pulses of various duration, magnitude and rise time into the input winding. The limiting factor, an amplifier slew rate of approximately 5 volts per microsecond, prevents the follower from linearly following inputs which change any faster than this.

Additional tests were performed to examine the effect on response of a dc component together with the ac input signal. In the midband region where the loop gain is maximum and constant and with the same component values it was found that the ac sensitivity decreased with increasing dc being reduced 10 percent with several hundred mat of dc and simultaneously degrading the bandwidth, indicating core saturation and a loop gain below unity. Since the core contributes to the gain, approaching core saturation will lower the loop gain and if the reduction is large causes the follower action to be imperfect.

The same tests were performed using an increased value of 2.5 ohms for resistor 38, which reduced the dc gain of the amplifier 21 by a factor of approximately 10 to about 400. Using the same feedback winding turns as before, the same sensitivities were achieved but at degraded low frequency response, i.e., the low frequency cutoff moving upward a decade in frequency.

The dc stability, however, improved with the additional dc feedback now applied to the amplifier. The resulting supply rejection ratio of better than 0.01 V/V then permits only 10 UA of dc current in the feedback winding with a supply voltage change of 1 volt thus contributing a dc MMF of 1 mat with the 100 turn feedback winding for example, with negligible effect on the core permeability and performance.

To test the performance with other feedback path impedances, the tests were again repeated with the increased value of 2.5 ohms for resistor 38, and with the feedback resistor 17 increased from 1K to 10K, thus restoring the original dc voltage feedback. With the same feedback winding turns as before the sensitivity afforded by each was increased by a factor of 10. In each case the bandwidth achieved was decreased to that associated with the increased sensitivity, i.e., the 100 turn feedback winding now offered the same sensitivity and bandwidth as the 10 turn feedback winding formerly offered with a 1K feedback resistor.

In like manner, increasing the feedback resistor 17 still further to 100K and resistor 38 to 25 ohms, offered a sensitivity of 1,000 V/AT with the 100 turn feedback winding and a bandwidth the same as earlier obtained with 1K, ¼ ohm and 1 turn respectively.

The current gain offered by the follower, i.e., the load current vs input current is related by eq. (13A) and within the current restraints of the amplifier, FIG. 11 of the test results, unity current gains or more are achievable. With a feedback winding of 10 turns, a feedback resistor of 10K, and an input winding of 1 turn for example, the current gain is unity into a load resistor of 1K. With the same component values the current gain is 10 into a load resistor of 100 ohms. Therefore, the output is available both as a voltage and current to a utilization or display device.

What is claimed is:

1. A network comprising a sense winding adapted to be responsive to an input signal which produces a varying MMF and flux in said sense winding, a feedback winding inductively coupled with said sense winding, quadrature amplifier circuit having an input coupled to said sense winding and means coupling at least a fraction of the output of said quadrature amplifier circuit to said feedback winding in a sense to produce with said feedback winding an MMF which opposes said input MMF and said flux in said sense winding by said input signal.

2. The network of claim 1 comprising an input winding inductively coupled with said sense and feedback windings to produce said varying MMF and flux in said sense winding.

3. The network of claim 1 including a core of a magnetic material extending through said input, sense and feedback windings.

4. The network of claim 3 wherein said core is of toroidal configuration.

5. The network of claim 2 wherein said amplifier circuit includes dc inverse feedback.

6. The network of claim 2 wherein said sense and feedback windings are at least partially coextensive.

7. The network of claim 6 wherein said sense and feedback windings are wound in the same direction.

8. The network of claim 7 wherein the output of said amplifier network is of inverted phase relative to its input.

9. The network of claim 8 including a first resistor connected in series with said feedback winding, and a second resistor connected between the output and the input of said amplifier circuit.

10. The network of claim 1 wherein said quadrature amplifier circuit is a voltage amplifier which is frequency compensated of the type with a single dominant pole.

11. The method of generating a signal in accordance with a time varying MMF and flux which includes the steps of reactively sensing the time rate of change of said flux in a sense winding, amplifying the same substantially in quadrature, and coupling a fraction of such amplified rate of change to a feedback winding in a sense to produce an opposing MMF and flux to said time varying MMF and flux.

12. The method of generating a signal in accordance with a time varying MMF and flux which includes the steps of sensing the time rate of change of said flux in a sense winding, amplifying same with substantially constant phase delay, coupling a fraction of such amplified rate of change to a feedback winding in a sense to produce an opposing MMF and flux to said time varying MMF and flux, providing a high coefficient of coupling between the sense winding and the feedback winding, and feeding an output voltage and current to said feedback winding which is in quadrature with the net induced voltage in the sense winding due to the MMF and flux of said feedback winding and input time varying MMF and flux inductively coupled with said sense and feedback windings.

* * * * *